United States Patent
Yamazaki et al.

(10) Patent No.: US 6,768,243 B1
(45) Date of Patent: Jul. 27, 2004

(54) SMALL-SIZE MOTOR BRUSH ASSEMBLY WITH ELECTRICAL NOISE SUPPRESSION

(75) Inventors: Hiroshi Yamazaki, Matsudo (JP); Hiroshi Kimura, Matsudo (JP)

(73) Assignee: Mabuchi Motor Co., Ltd., Chiba (JP)

( * ) Notice: Subject to any disclaimer, the term of this patent is extended or adjusted under 35 U.S.C. 154(b) by 573 days.

(21) Appl. No.: 09/869,167

(22) PCT Filed: Oct. 24, 2000

(86) PCT No.: PCT/JP00/07439

§ 371 (c)(1),
(2), (4) Date: Jun. 22, 2001

(87) PCT Pub. No.: WO01/39354

PCT Pub. Date: May 31, 2001

(30) Foreign Application Priority Data

Nov. 25, 1999 (JP) ............................................ 11-333968

(51) Int. Cl.[7] .............................................. H02K 11/00
(52) U.S. Cl. .................... 310/239; 310/51; 310/242; 310/244; 310/249; 310/71; 310/40 MM
(58) Field of Search ........................ 310/239, 51, 68 R, 310/242–248

(56) References Cited

U.S. PATENT DOCUMENTS

| | | | | |
|---|---|---|---|---|
| 4,845,393 A | * | 7/1989 | Burgess et al. | ............... 310/51 |
| 5,281,876 A | * | 1/1994 | Sato | ..................... 310/40 MM |
| 5,563,462 A | * | 10/1996 | Strobl et al. | ................... 310/71 |
| 5,717,270 A | * | 2/1998 | Lau et al. | ................... 310/220 |
| 5,734,212 A | * | 3/1998 | Uffelman | ..................... 310/51 |
| 6,580,194 B2 | * | 6/2003 | Mizutani et al. | ............ 310/239 |

FOREIGN PATENT DOCUMENTS

| | | | | |
|---|---|---|---|---|
| EP | 415367 A1 | * | 3/1991 | ........... H02K/11/00 |
| EP | 544404 A2 | * | 6/1993 | ............ H02K/5/14 |
| JP | 58-131165 | | 9/1983 | ........... H02K/11/00 |
| JP | 60131058 A | * | 7/1985 | .......... H02K/23/66 |
| JP | 62-95485 | | 6/1987 | ........... H02K/11/00 |
| JP | 4-121384 | | 10/1992 | ......... H02K/23/00 |
| JP | 07099754 A | * | 4/1995 | ........... H02K/11/00 |
| JP | 7-194063 | | 7/1995 | ........... H02K/11/02 |
| JP | 2001008414 A | * | 1/2001 | ........... H02K/11/00 |
| JP | 2002315274 A | * | 10/2002 | .......... H02K/13/00 |

* cited by examiner

*Primary Examiner*—Karl Tamai
*Assistant Examiner*—Yahveh Comas
(74) *Attorney, Agent, or Firm*—McGlew and Tuttle, P.C.

(57) ABSTRACT

A small-size motor has a case cover 11 formed with three voids, and electric elements such as chip capacitors are contained in the three voids. A first electric element is mechanically fixed between a pair of brush units in a first void and is electrically connected. The remaining two second and third electric elements are located on both sides of the first electric element and are pressed on a brush base in a motor shaft direction by a body earth terminal 14 in second and third voids, so that the body earth terminal 14 is fixed to the case cover 11 and the two electric elements are mechanically fixed and electrically connected. A sufficient space is secured in the motor case cover made of synthetic resin, so that three electric elements such as chip capacitors can be incorporated together with their wiring and support arrangement.

6 Claims, 6 Drawing Sheets

Brush Unit

14 Body Earth Terminal
19 Chip Capacitor
7 Case Cover Fitting Portion

Body Earth Terminal 16
16 Element Pressing Portion
17 Body Earth Portion
20 Holding Portion 26 Input Terminal
11 Case Cover
12
4 Carbon Brush
26a
25 Spring Member
28
27
15 Capacitor (A)

(B)

A — A Sectional View

Body Earth Terminal

SMALL-SIZE MOTOR BRUSH ASSEMBLY WITH ELECTRICAL NOISE SUPPRESSION

TECHNICAL FIELD

The present invention relates to a small-size motor and, more particularly, to a small-size motor capable of being directly fitted with electric elements such as capacitors for driving electrical equipment, household electrical appliances, or the like.

BACKGROUND ART

A small-size motor used for driving electrical equipment, household electrical appliances, or the like is desired to be directly fitted with electric elements such as a capacitor, a diode, and a choke coil, in a motor case cover made of synthetic resin. For example, chip capacitors are attached to reduce electrical noise. However, the case cover of the conventional small-size motor has an insufficient space for installing a required number of electric elements.

FIG. 6 is a view of a case cover of a small-size motor having a conventional construction, which is viewed from the inside of the motor (see Japanese Utility Model Application Laid-Open No. 4-121384). FIG. 7 is a partially sectional view of the case cover shown in FIG. 6, in which the case cover is cut at a capacitor portion. In FIGS. 6 and 7, a case cover 11 made of synthetic resin is provided with a pair of input terminals 26 and a pair of brush arms 12. Each of carbon brushes 4 is fixed respectively at a free end of the brush arm 12 connected electrically to the input terminal 26.

Each of a pair of capacitors 15 is inserted in a void formed in the case cover 11. An electrode 27 on one side of the capacitor 15 is in contact with the extension 26a of the input terminal 26, and on the other hand, a substantially U-shaped spring member 25 is in contact with an electrode 28 on the other side of the capacitor 15. Thus, not only electrical connection can be ensured, but also the capacitors 15 can be fixed firmly in a void in the case cover 11 by being pressed transversely. The spring member 25 also can ensure electrical connection with a metallic case when the case cover 11 is fitted to the case.

By the capacitor installation construction as shown in the figures, the need for soldering work and lay-out work for connection wires, which necessarily accompany the connection work for electric elements, can be eliminated. Thus, the electric elements such as capacitors are securely fixed in a limited space, and on the other hand, electrical connection can be provided with high reliability. However, although two electric elements can be installed in the case cover by the construction shown in the figures, three electric elements cannot be installed.

FIG. 8 is a view for illustrating the need for installing three electric elements. FIG. 8(A) is a schematic electrical connection diagram for a small-size motor having a conventional construction as shown in FIG. 6. In FIG. 8, reference character M denotes a motor, and C1 to C3 denote capacitors. A power source is connected to rotor windings of the motor M via brushes from the input terminals, and also is connected respectively to one electrode of each of the two capacitors C1 and C2. The other electrodes of the two capacitors C1 and C2 are connected to each other, and grounded to the metallic case of the motor from the connection point. In the conventional configuration shown in FIG. 8(A), since only two capacitors C1 and C2 can be installed, the configuration as shown in the FIG. 8(A) is unwillingly adopted, and therefore the electrical noise reducing effect is insufficient on the low-frequency band.

DISCLOSURE OF THE INVENTION

Contrarily, if three capacitors can be installed to provide electrical connection, the wiring can be accomplished as shown in FIG. 8(B). Specifically, in addition to the wiring shown in FIG. 8(A), a third capacitor C3 can be connected across both input terminals. It has been known that such a circuit is superior in terms of the electrical noise reducing effect on the low-frequency band.

Accordingly, an object of the present invention is to provide a small-size motor in which a sufficient space is secured in a motor case cover made of synthetic resin so that three electric elements such as chip capacitors can be incorporated together with their wiring and support arrangement.

The small-size motor in accordance with the present invention includes a metallic case 1 having a bottomed hollow cylindrical shape, fitted with a magnet 2 on the inner peripheral surface thereof; a case cover 11 made of synthetic resin, mounted so as to close an opening of the case 1; and a rotor fitted with a laminated core 22, windings 23 wound on the laminated core 22, and a commutator 24 on a shaft 21. The case cover 11 supports a pair of brush units each of which has a brush arm 12 fitted with a brush 4 and a brush base 13 fixed and connected to the brush arm 12. The case cover 11 is formed with three voids to contain three electric elements such as chip capacitors. A first electric element is fixed mechanically between the paired brush units in a first void to be connected electrically. The remaining two second and third electric elements are located on both sides of the first electric element and are pressed on the brush base in the motor shaft direction by a body earth terminal 14 in second and third voids, so that the body earth terminal 14 is fixed to the case cover 11, whereby the two electric elements are fixed mechanically and connected electrically.

Also, the first electric element is fixed mechanically and connected electrically between both fixing portions 8 via a metallic spring (U-shaped spring 18), each of which connects the brush arm 12 of each of the paired brush units with the brush base 13. One electrode of each of the second and third electric elements is mounted on the side face of a brush base end portion 9, and the other electrode thereof is pressed by the body earth terminal 14.

Further, the body earth terminal 14, which is formed by being stamped out of a metal plate and being bent, includes an element pressing portion 16 for pressing the electric element, a body earth portion 17, and a holding portion 20, and is installed so as to cover a case cover fitting portion 7 fitted to the case 1 in such a manner that the case cover fitting portion 7 is held by the body earth portion 17 from the outside and by the holding portion 20 from the inside.

Thus, three electric elements such as chip capacitors can be incorporated together with their wiring and support arrangement.

BEST MODE FOR CARRYING OUT THE INVENTION

Figure 1:
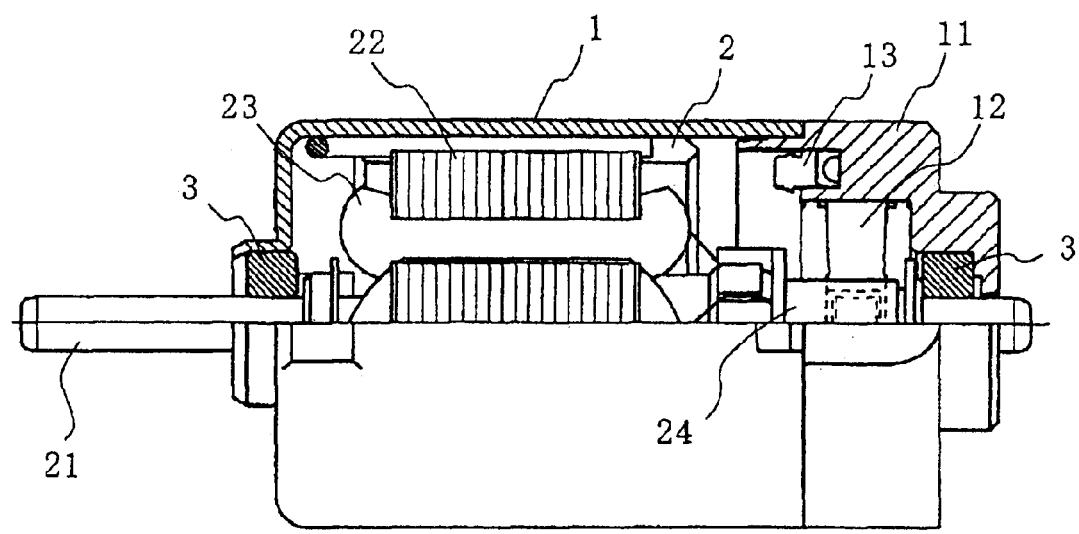
FIG. 1 is a side view showing the whole of a small-size motor in accordance with the present invention, in which an upper half portion of the motor is shown in cross section.

FIG. 1 is a side view showing the whole of a small-size motor in accordance with the present invention, in which an upper half portion of the motor is shown in cross section. The small-size motor in accordance with the present invention is not especially different from the small-size motor having a conventional construction except for the arrangement of a case cover to which brushes, input terminals, electric elements, or the like are installed. As shown in FIG. 1, magnets 2 are installed on the inner peripheral surface of a case 1 formed of a metallic material into a bottomed hollow cylindrical shape. An opening of the case 1 is closed by a case cover 11 made of synthetic resin that is fitted on the opening of the case 1. In the central portion of the case cover 11 is contained a bearing 3 for a shaft 21.

The other end of the shaft 21 is supported by a bearing 3 provided in the center of the bottom of the case 1 of a bottomed hollow cylindrical shape. The shaft 21 is usually provided with a laminated core 22, windings 23 wound on the laminated core 22, and a commutator 24, which constitute a rotor of the small-size motor. Each of a pair of carbon brushes being in contact with the commutator 24 is installed to a brush unit fixed to the case cover 11.

Figure 2:
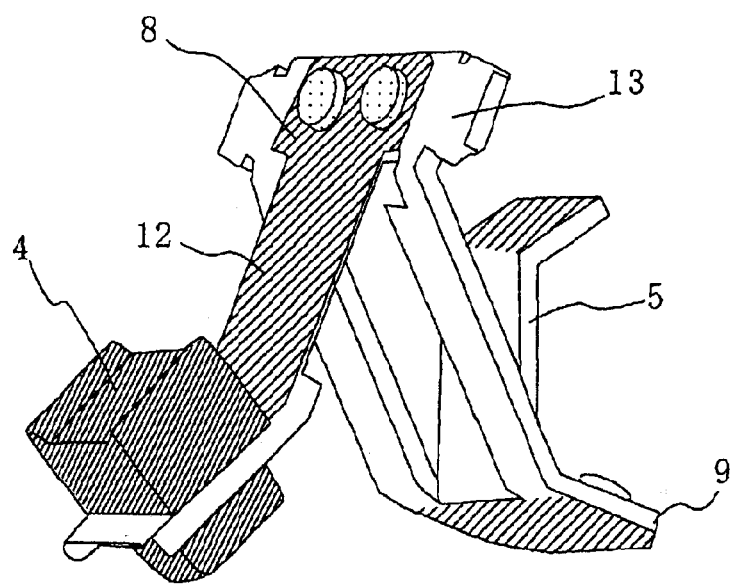
FIG. 2 is a view of one of a pair of symmetrical brush units, taken out of the motor.
Figure 3:
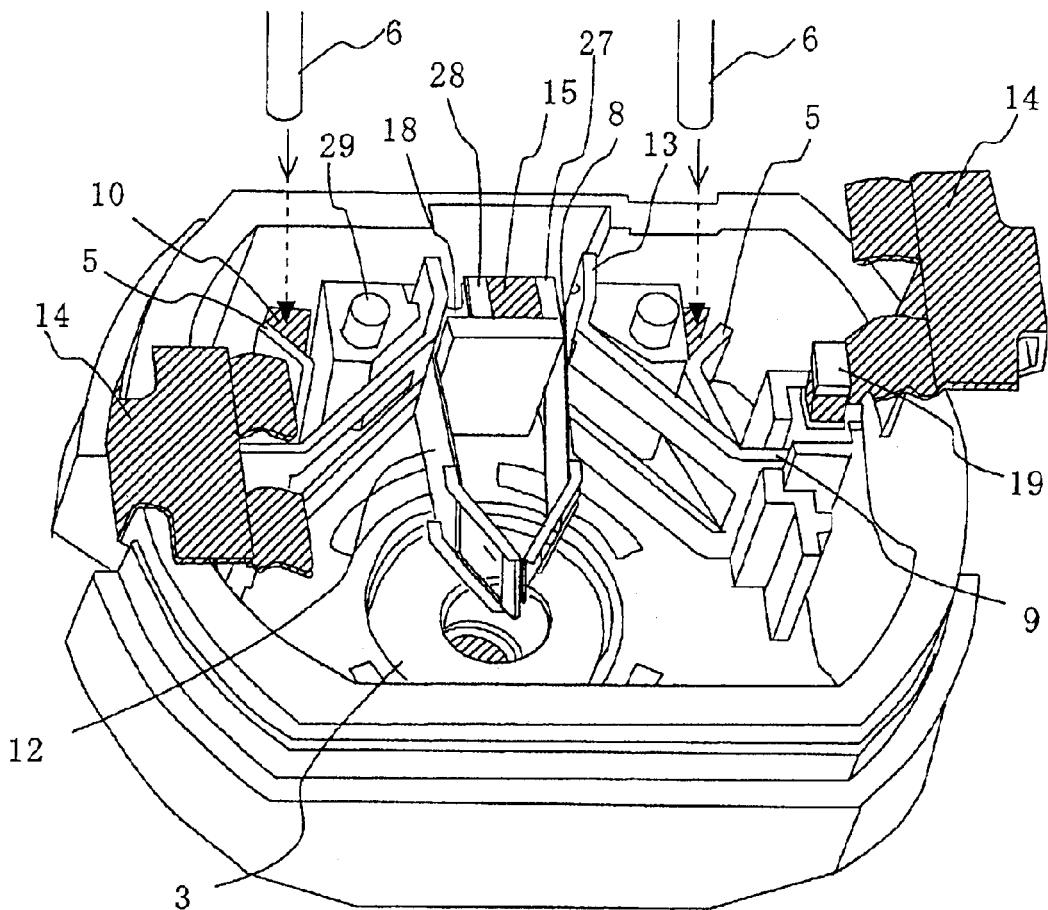
FIG. 3 is a perspective view of a case cover of the small-size motor shown in FIG. 1, in which the case cover is viewed from the inside of the motor.

FIG. 3 is a perspective view of a case cover of the small-size motor shown in FIG. 1, in which the case cover is viewed from the inside of the motor, showing a first example of wiring and support arrangement for electric elements. Now, a pair of brush units shown in FIG. 3 will be described. FIG. 2 is a view of one of the paired symmetrical brush units, taken out of the motor. FIG. 3 shows a state in which carbon brushes 4 are removed.

As shown in FIG. 2, the brush unit is made up of the carbon brush 4 being in slidable contact with the commutator 24, a brush arm 12 for press fitting and holding the carbon brush 4, and a brush base 13 connected with the brush arm 12 by caulking. The caulking is performed by inserting protrusions provided on the connection face of the brush base 13 into holes formed correspondingly in the brush arm 12 as shown in FIG. 2 and then by crushing the tip ends of the protrusions by applying a pressure. The brush base 13 is provided with a receptacle terminal 5 formed by cutting and raising a central part of the brush base 13. Therefore, when the receptacle terminal 5 is cut and raised from the brush base 13, a hole corresponding to the cut is formed in the central portion of the brush base 13.

The brush unit constructed as described above is pressed in and held by an attachment portion formed integrally with the synthetic resin made case cover 11 as shown in FIG. 3. At this time, the brush unit is fixed at two locations of a fixing portion 8 in which the brush arm 12 is fixed to the brush base 13, and a brush base end portion 9 integral with a base portion of the receptacle terminal 5. The receptacle terminals 5 are brought into electrical contact with a pair of outside terminals 6 inserted from the outside through outside terminal insertion holes 10.

Figure 8:
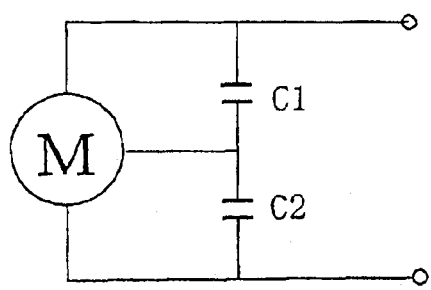
FIG. 8 is a view for illustrating the need for installing three electric elements.
Figure 8:
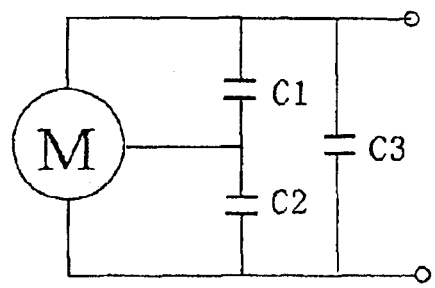

A first chip capacitor 15 (corresponding to C3 shown in FIG. 8(B)) is located in a void defined by a side wall and a projecting portion formed of synthetic resin integrally with the case cover 11, and is fixed between the paired brush units by using a U-shaped spring 18. Thereby, sufficient and reliable fixation of capacitor can be accomplished. However, by further pressing the capacitor with a plate made of synthetic resin, the fixation of capacitor can be made more reliable, and the capacitor can be prevented from coming off. Specifically, a pair of protrusions 29 formed integrally with the case cover 11 are provided, and the synthetic resin made plate (not shown) in which holes corresponding to the paired protrusions 29 are formed is prepared. After the brush units, the chip capacitor, or the like are assembled, the synthetic resin made plate is mounted by inserting the paired protrusions 29 into the holes, and thereafter the end portions of the protrusions 29 are crushed by applying a pressure, so that the synthetic resin made plate can be fixed.

As shown in FIG. 3, one electrode 27 of the chip capacitor is brought into direct contact with the fixing portion 8 of one brush unit, in which the brush arm 12 is fixed to the brush base 13, and the other electrode 28 thereof is brought into contact with the fixing portion 8 of the other brush unit via the metallic U-shaped spring, in which the brush arm 12 is fixed to the brush base 13. Thus, the chip capacitor 15 can not only be fixed securely, but also be connected electrically across both input terminals.

Second and third chip capacitors 19 corresponding to C1 and C2 shown in FIG. 8(B) are installed symmetrically at both sides of the case cover 11, and are also connected electrically. The electrodes of the paired, right and left, chip capacitors 19 are arranged in the motor shaft direction as shown in FIG. 3. After one electrode of the chip capacitor 19 is mounted on the side face of the brush base end portion 9, the body earth terminal 14 itself is fixed to the case cover so that the other electrode can be pressed by a metallic body earth terminal 14. When the case cover 11 is fitted and fixed on the opening of the metallic case 1, the body earth terminal 14 is held between the case cover 11 and the case 1 to make the fixation secure and to provide electrically a body ground to the metallic case 1. Thus, one electrode of each of the paired chip capacitors 19 is electrically connected to the brush unit and therefore to the input terminal, and the other electrode thereof is body grounded commonly.

Figure 4:
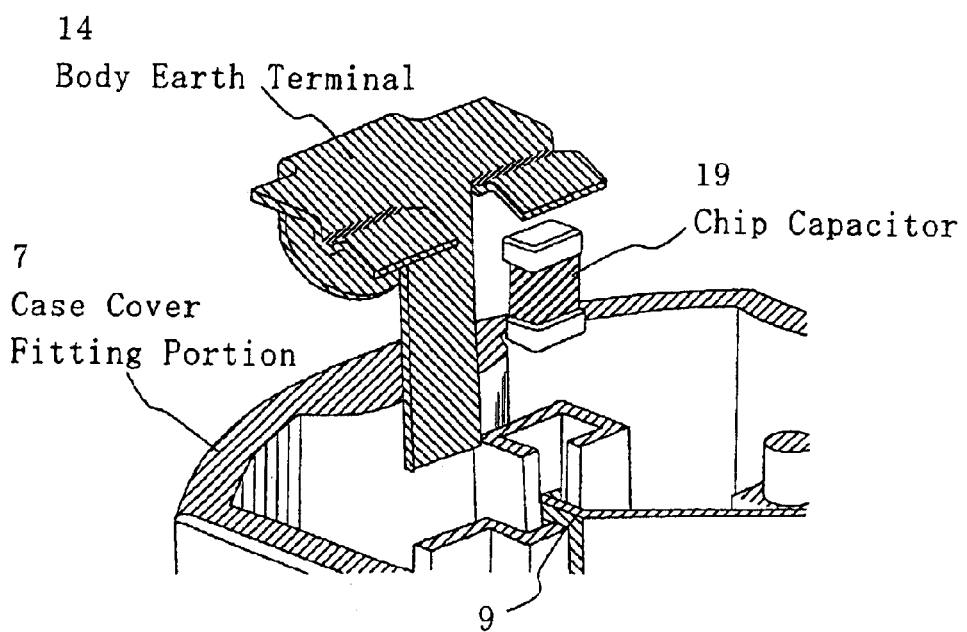
FIG. 4 is a partial perspective view for illustrating the installation of a body earth terminal to a case cover.
Figure 5:
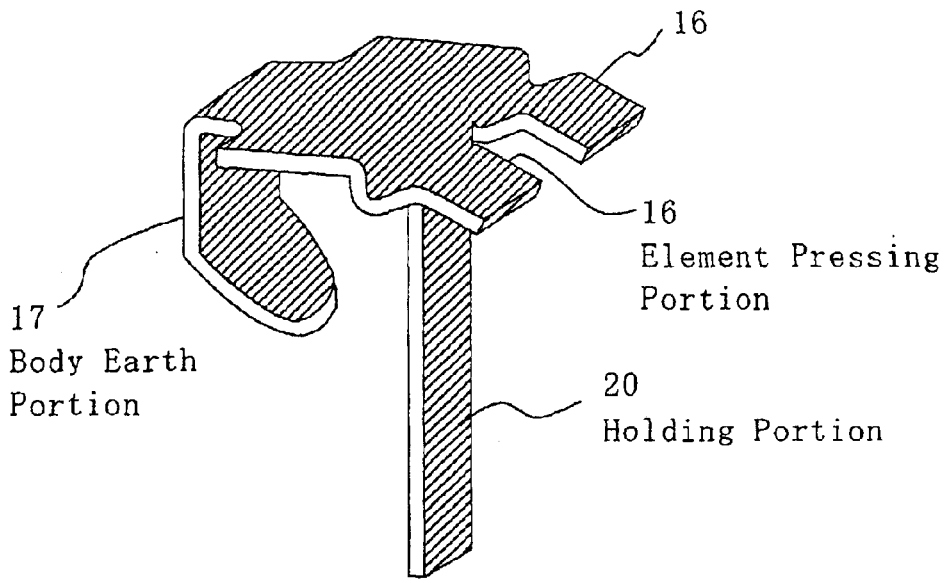
FIG. 5 is a detailed view showing only a body earth terminal taken out of the motor.
Figure 6:
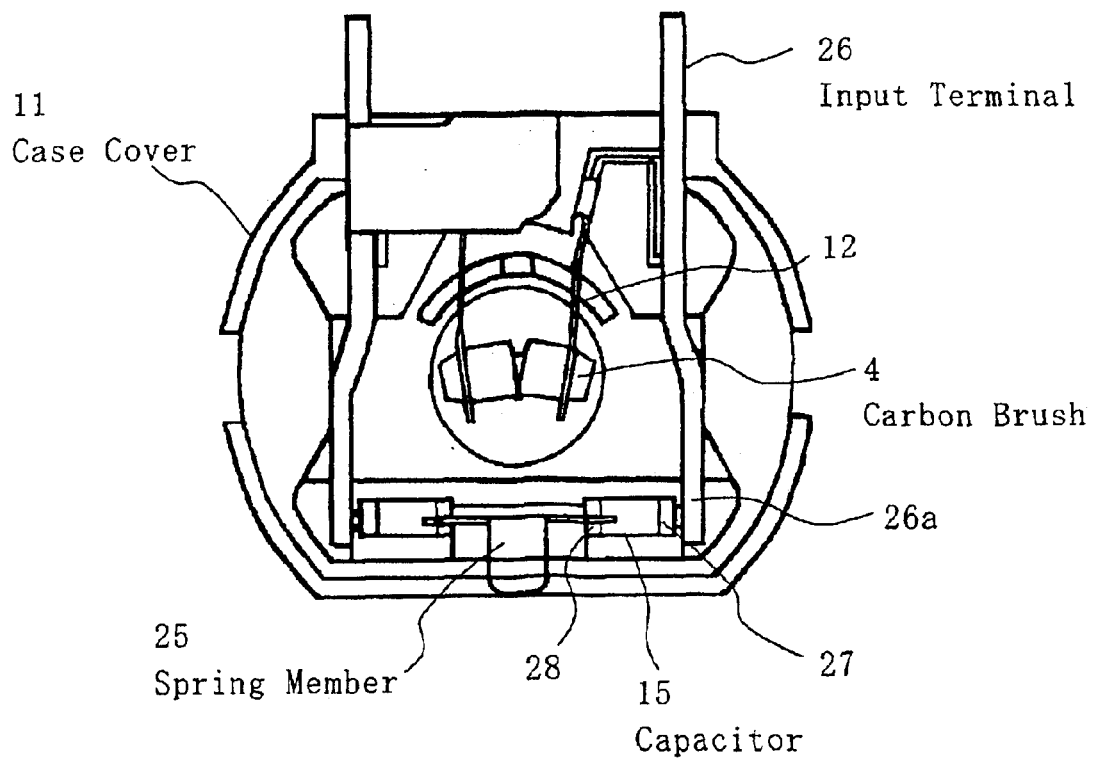
FIG. 6 is a view of a case cover of a small-size motor having a conventional construction, in which the case cover is viewed from the inside of the motor.
Figure 7:
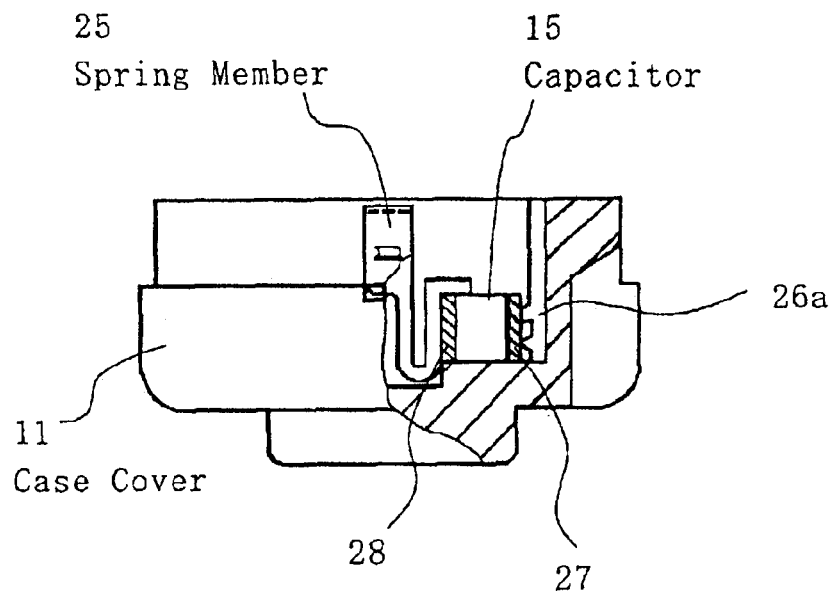
FIG. 7 is a partially sectional view of the case cover shown in FIG. 6, in which the case cover is cut at a capacitor portion.

FIG. 4 is a partial perspective view for illustrating the installation of a body earth terminal to a case cover, and FIG. 5 is a detailed view showing only a body earth terminal taken out of the motor. The body earth terminal 14, which is formed by being stamped out of a metal plate and being bent, is made up of a pair of element pressing portions 16 of a chevron shape for pressing the chip capacitor, a body earth portion 17, and a holding portion 20. By making the element pressing portion 16 in a chevron shape, a tolerance of chip capacitor size can be absorbed. The body earth terminal 14 is installed so as to cover a case cover fitting portion 7 fitted to the case 1 in such a manner that the case cover fitting portion 7 is held by the body earth portion 17 from the outside and by the holding portion 20 from the inside. At this time, the chip capacitor 19 is pressed by the element pressing portion 16 and the side face of the brush base end portion 9 in a void defined by a projecting portion formed integrally with the synthetic resin made case cover 11. FIGS. 4 and 5 show, as an example, the body earth terminal 14 in which the paired element pressing portions 16 are provided on both sides of the holding portion 20 for one body earth terminal 14. By arranging the element pressing portions 16 symmetrically in this manner, the body earth terminal can be used commonly as either of the paired body earth terminals used for one case cover.

Figure 9:
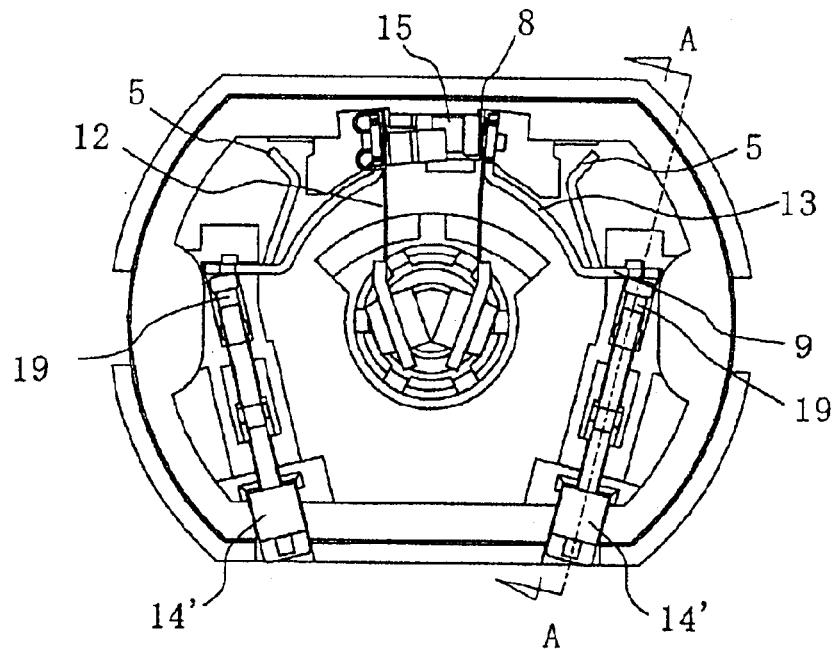
FIG. 9 is a view of another case cover of a small-size motor, in which the case cover is viewed from the inside of the motor, showing a second example of wiring and support arrangement for electric elements different from that shown in FIG. 3.
Figure 10:
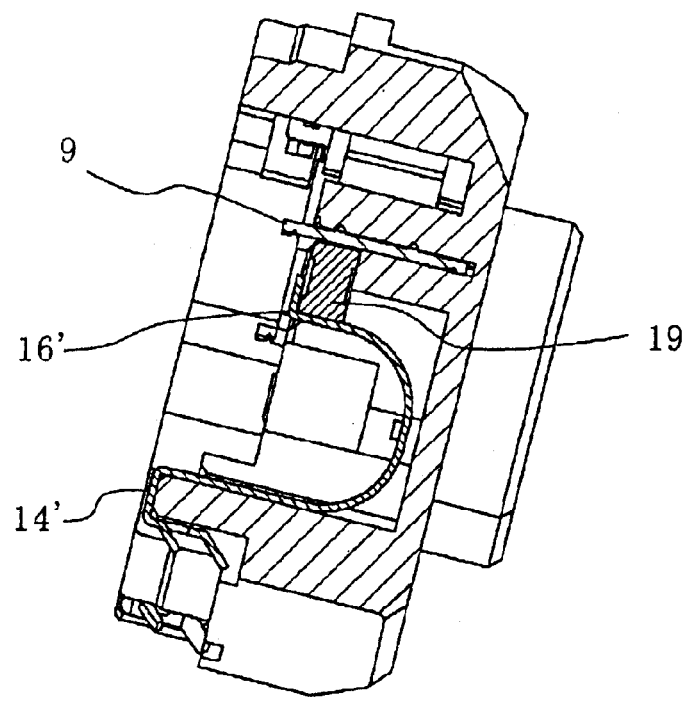
FIG. 10 is a sectional view taken along a line A—A in FIG. 9.
Figure 11:
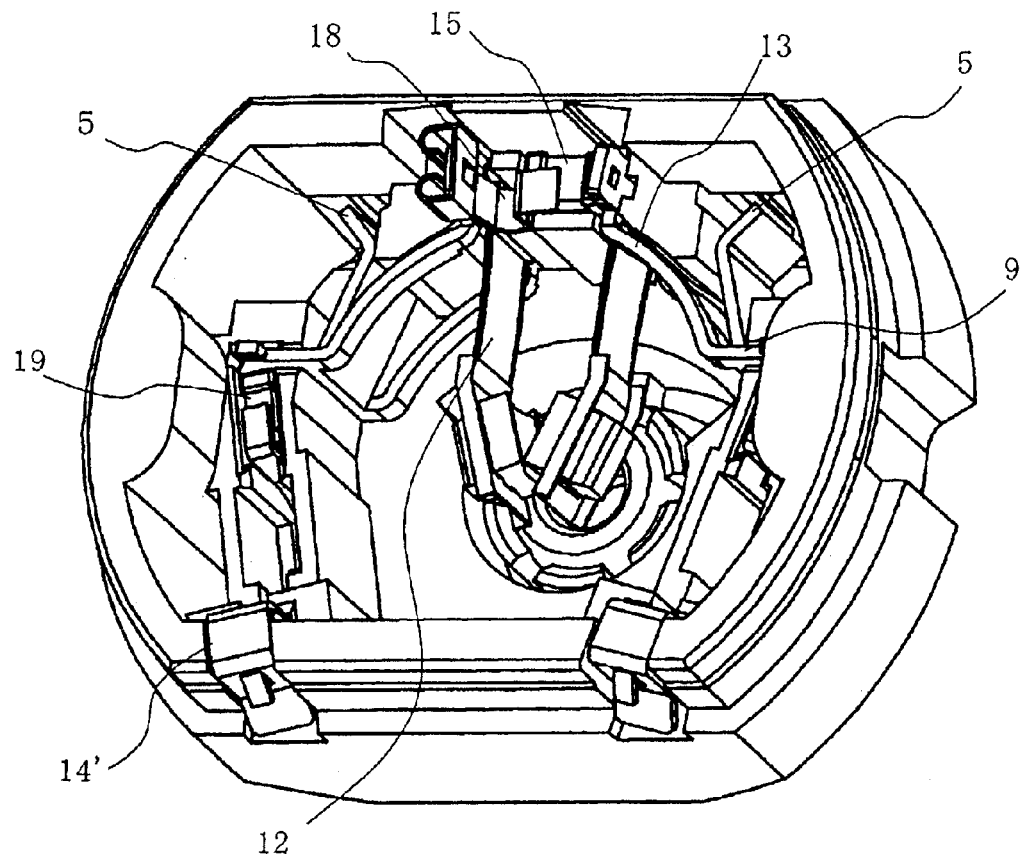
FIG. 11 is a perspective view of the case cover shown in FIG. 9, in which the case cover is viewed from the inside.
Figure 12:
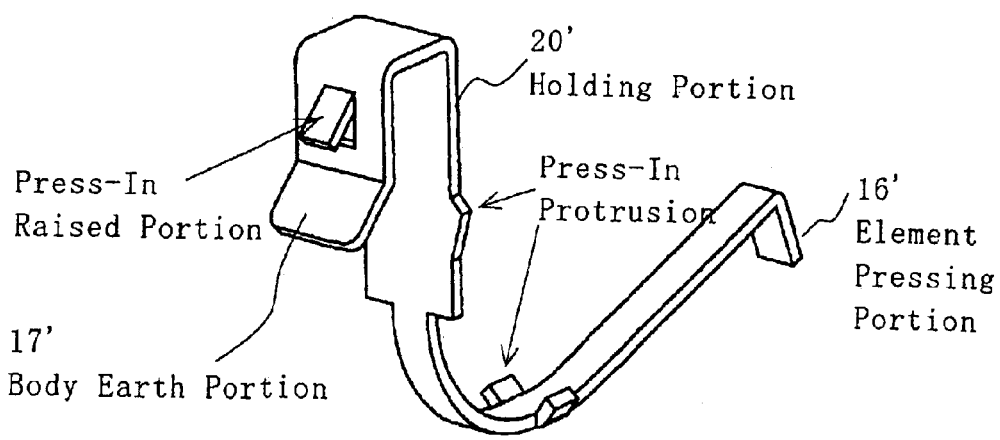
FIG. 12 is a perspective view of the body earth terminal 14' taken out of the motor shown in the second example.

FIGS. 9 to 12 show a second example of wiring and support arrangement for electric elements different from that shown in FIG. 3. FIG. 9 is a view of a case cover of a small-size motor, in which the case cover is viewed from the inside of the motor, FIG. 10 is a sectional view taken along the line A—A in FIG. 9, FIG. 11 is a perspective view of the case cover shown in FIG. 9, in which the case cover is viewed from the inside, and FIG. 12 is a perspective view of a body earth terminal 14' taken out of the motor shown in the second example.

The first chip capacitor 15 may be installed in the same way as that in the first example explained with reference to FIG. 3. Therefore, the detailed explanation thereof is omitted.

The same paired brush units as those explained with reference to FIG. 2 may be used. In the second example, however, there is used a brush unit in which the brush base 13 connected with the brush arm 12 for press fitting and holding the carbon brush is curved into an arc shape, not being straight as shown in FIG. 2. The reason for this is that when a disk-shaped varistor for extinguish a spark produced on the brush contact with the commutator is installed on the winding side of the commutator of the rotor, the brush base 13 is prevented from coming into contact with the disk-shaped varistor. Other constructions of the brush unit are as explained with reference to FIG. 2.

The second and third chip capacitors 19 corresponding to C1 and C2 shown in FIG. 8(B) are installed symmetrically at both sides of the case cover 11. The chip capacitor 19 shown in FIG. 3 is mounted on the side face of the brush base end portion 9 and is pressed by the metallic body earth terminal 14 from the motor shaft side. Contrarily, in the second example, as shown in FIG. 9 or 11, both electrodes of the chip capacitor 19 are held and fixed in the vertical direction (up and down) in the figure and are connected electrically.

As best seen from FIG. 10, which is a sectional view taken along the line A—A in FIG. 9, the chip capacitor 19 is held and fixed between the brush base end portion 9 and an element pressing portion 16' of the body earth terminal 14'. The body earth terminal 14' has a construction as shown in FIG. 12. The element pressing portion 16' at one end of the body earth terminal 14' presses the chip capacitor 19, and a body earth portion 17' and a holding potion 20' are set on the case cover so as to hold the case cover therebetween. Thereafter, when the case cover 11 is fitted and fixed on the opening of the metallic case 1, the body earth terminal 14' is held between the case cover 11 and the case 1 to make the fixation secure. At this time, electrically, the body earth terminal 14' provides a body ground to the metallic case 1. Thus, one electrode of each of the paired chip capacitors 19 is electrically connected to the brush unit and therefore to the input terminal, and the other electrode thereof is body grounded commonly.

The body earth terminal 14' shown in FIG. 12 is formed by being stamped out of a metal plate (for example, phosphor bronze) and being bent. Such a simple construction makes fabrication easy. Protrusions and raised portion provided at a plurality of locations of the body earth terminal 14' are pressed into concaves formed in the synthetic resin made case cover to fix the body earth terminal 14' to the case cover.

INDUSTRIAL APPLICABILITY

As described above, according to the present invention, three voids are formed in a case cover to contain electric elements such as chip capacitors. A first electric element is fixed between a pair of brush units and is connected electrically. On the other hand, the remaining two electric elements are located on both sides of the first electric element and are pressed on a brush base in the motor shaft direction by a body earth terminal, so that the body earth terminal is fixed to the case cover. Thereby, the two electric elements are fixed mechanically and connected electrically. Thereupon, a sufficient space is secured in the motor case cover made of synthetic resin, so that three electric elements such as chip capacitors can be incorporated together with their wiring and support arrangement without the need for soldering.

Further, an electrical noise reducing element need not be provided on the outside of a motor, and electrical noise can be reduced over a wide band.

What is claimed is:

1. A small-size motor including a metallic case of a bottomed hollow cylindrical shape fitted with magnets on the inner peripheral surface thereof, a case cover made of synthetic resin mounted so as to close an opening of said case, and a rotor fitted with a laminated core, windings wound on said laminated core, and a commutator on a shaft, wherein said case cover supports a pair of brush units each of which includes a brush arm fitted with a brush and a brush base fixed and connected to said brush arm, and wherein said case cover is formed with three voids to contain three electric elements, a first electric element is fixed mechanically between said paired brush units in a first void and is connected electrically, and the remaining two second and third electric elements are located on both sides of said first electric element and are pressed on said brush base in the motor shaft direction by a body earth terminal in second and third voids, so that said body earth terminal is fixed to said case cover and said two electric elements are fixed mechanically and connected electrically.

2. The small-size motor according to claim 1, wherein said first electric element is fixed mechanically between fixing portions of said brush arm and said brush base of each of said paired brush units via a metallic spring and is connected electrically.

3. The small-size motor according to claim 1, wherein one electrode of each of said second and third electric elements is mounted on the side face of a brush base end portion, and the other electrode thereof is pressed by said body earth terminal.

4. The small-size motor according to claim 1, wherein each of said second and third electric elements is fixed by being held between said brush base end portion and an element pressing portion of said body earth terminal.

5. The small-size motor according to claim 1, wherein said body earth terminal which is formed by being stamped out of a metal plate and being bent, includes an element pressing portion for pressing said electric element, a body earth portion, and a holding portion, and is installed so as to cover a case cover fitting portion fitted to said case in such a manner that said case cover fitting portion is held by said body earth portion from the outside and by said holding portion from the inside.

6. The small-size motor according to claim 1, wherein all of said first to third electric elements are chip capacitors.

* * * * *